UNITED STATES PATENT OFFICE.

WILLIAM MORRISON, OF DES MOINES, IOWA.

PROCESS FOR MAKING MATERIAL FOR ALKALINE BATTERIES.

976,279.   Specification of Letters Patent.   Patented Nov. 22, 1910.

No Drawing.   Application filed October 10, 1910.  Serial No. 586,333.

*To all whom it may concern:*

Be it known that I, WILLIAM MORRISON, a citizen of the United States of America, and resident of Des Moines, Iowa, have invented a certain new and useful Improvement in Processes for Making Material for Alkaline Batteries, of which the following is a specification.

My invention relates to improvements in galvanic batteries in which zinc is one of the elements, and more particularly in which the positive electrode consists of a compound of zinc and chromium and in which an alkaline electrolyte is used, such as described in my co-pending application Serial Number 529,187, filed November 22, 1909.

My invention consists more specifically in an improved method for producing this compound.

These and other objects as will hereinafter more fully appear are attained by my invention.

It is well known that chromic hydroxid acts as an acid when brought in contact with a strong base, yielding salts which are known as chromites. Some of these salts or chromites are insoluble in alkalies.

My improved positive electrode consists of a compound of zinc and chromium, together with a sufficient amount of mercury. The mercury, however, is not the active material, but is merely used in the ordinary manner to act as an amalgamator and a distributer for the potassium of the potassium hydroxid which I employ as my electrolyte. I produce this zinc chromium compound in the following manner:

I first take a suitable quantity of zinc oxid and add to the same a suitable quantity of an aqueous solution of dichromate of potassium and boil the two together until they are thoroughly combined. The proportions which are used may be varied to a large extent, although I find that satisfactory results are obtained by mixing two pounds of the zinc oxid to one pound of the dichromate. I find it best to use such an amount as will only produce a partial chromate of zinc. That is, I only use a fraction of the amount of dichromate which is necessary to form a definite zinc chromate. The residual solution is then poured off and the chromate of zinc washed and dried. This is then mixed with a suitable amount of mercury or an oxid of mercury, as described in my prior application, and pressed into a support for use in a storage battery containing alkaline electrolyte. Upon the first charging of the battery, this chromate of zinc is reduced to a low-oxygen compound of zinc and chromium, similar to that described in my said prior application. The electrolytic reduction may however be effected outside the battery. The zinc-chromium compound is not reoxidized to the original chromate when the battery is discharged.

What I claim as my invention is:

1. The process of producing a compound for use in reversible alkaline batteries, which comprises electrolytically reducing a compound containing zinc chromate in the presence of an alkaline electrolyte.

2. The process of producing a compound for use in reversible alkaline batteries, which comprises electrolytically reducing a mixture containing zinc chromate and zinc oxid in the presence of an alkaline electrolyte.

3. The process of producing a compound for use in reversible alkaline batteries, which comprises electrolytically reducing a mixture containing zinc chromate, zinc oxid and mercury oxid in the presence of an alkaline electrolyte.

4. The process of producing a compound for use in reversible alkaline batteries, which comprises combining zinc oxid and a suitable dichromate to form chromate of zinc, and electrolytically reducing the product.

5. The process of producing a compound for use in reversible alkaline batteries, which comprises adding to zinc oxid sufficient potassium dichromate to partially convert the zinc into chromate, and electrolytically reducing the product.

6. The process of producing a compound for use in reversible alkaline batteries, which comprises combining zinc oxid and a suitable dichromate to form chromate of zinc, mixing the product with mercury oxid, and subjecting the mixture to electrolytic reduction.

7. The process of producing a compound for use in reversible alkaline batteries, which comprises combining suitable quantities of zinc oxid and dichromate of potassium, to effect partial conversion of the zinc into chromate, mixing the product with mercury oxid, and subjecting the mixture to electrolytic reduction.

Signed by me at Washington, District of Columbia, this 8th day of October 1910.

WILLIAM MORRISON.

Witnesses:
   Jos. H. Blackwood,
   H. A. Swenarton.